Nov. 5, 1957 P. M. CHRISTENSEN Re. 24,388
AUTOMATIC CIRCUIT BREAKERS
Original Filed April 17, 1951
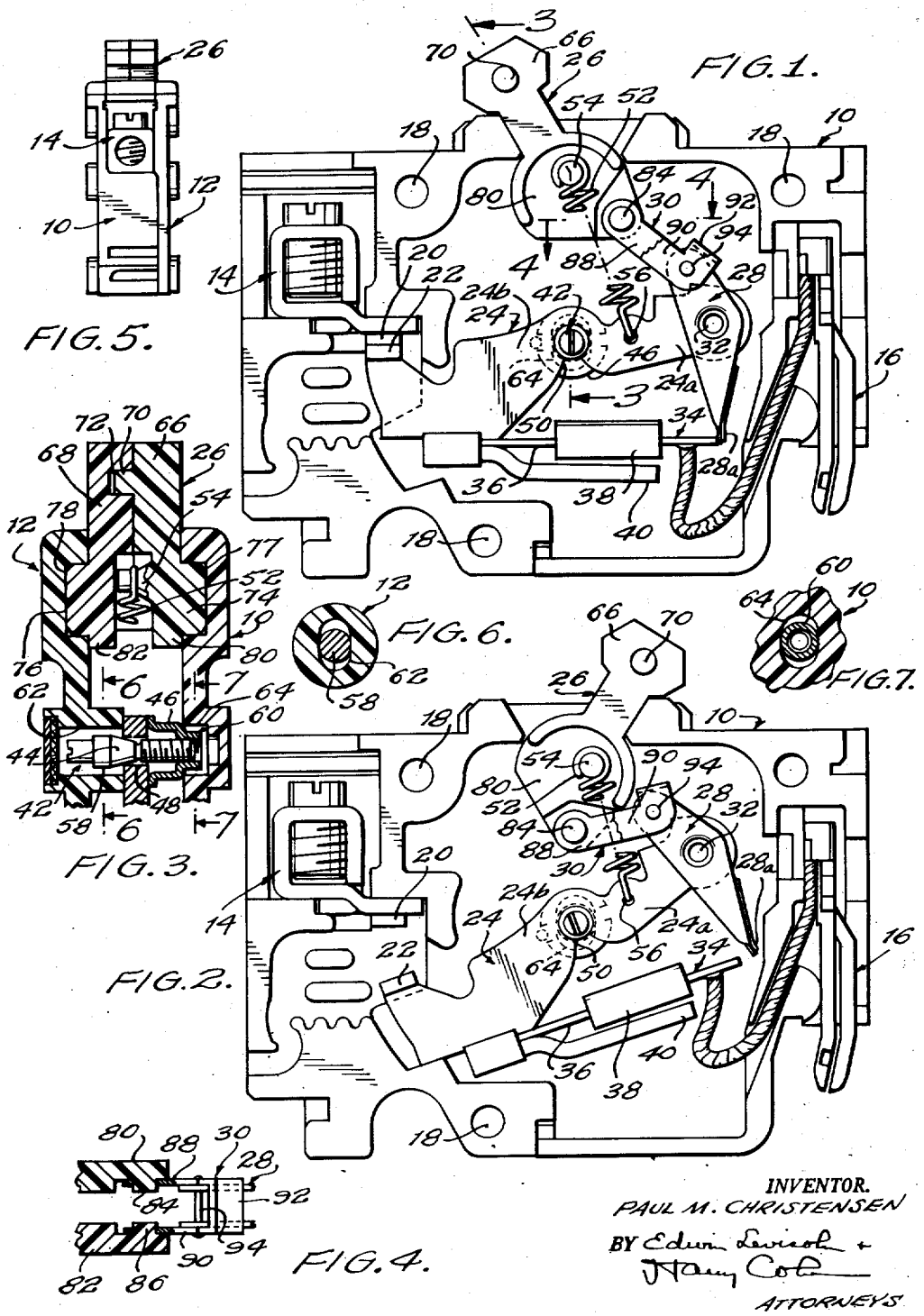
INVENTOR.
PAUL M. CHRISTENSEN
BY Edwin Levisohn +
J Harry Cole
ATTORNEYS United States Patent Office Re. 24,388
Reissued Nov. 5, 1957

24,388

AUTOMATIC CIRCUIT BREAKERS

Paul M. Christensen, West Orange, N. J., assignor to Federal Pacific Electric Company, a corporation of Delaware Original No. 2,789,179, dated April 16, 1957, Serial No. 221,420, April 17, 1951. Application for reissue June 14, 1957, Serial No. 667,061

25 Claims. (Cl. 200—116)

Matter enclosed in heavy brackets [ ] appears in the original patent but forms no part of this reissue specification; matter printed in italics indicates the additions made by reissue.

My present invention relates to automatic circuit breakers and more particularly to circuit breakers of the type in which an actuator is pivotally carried by the movable contact member and is latched thereto, under the control of a current-responsive device, for the manual operation of the circuit breaker to open and close it.

A circuit breaker of the general type to which the present invention relates is shown in Patent No. 2,209,352, issued on an application filed by me and Joseph Sachs, and is also shown in Patent No. Re. 23,188, issued on an application filed in the name of Harold A. Humpage, as well as by several pending applications assigned to the assignee of my present application, one or more of which applications will be subsequently referred to as the description proceeds.

As indicated by me and Joseph Sachs in said Patent No. 2,209,352 provision should be made for resiliently acting on the movable contact member for assuring the required contact pressure or proper engagement between the companion contacts of the circuit breaker when the breaker is closed, a resilient link indicated at 18 in said Patent No. 2,209,352, which connects the handle to the actuator, being provided for that purpose. Pursuant to the present invention it is unnecessary to provide a resilient link between the handle and the actuator for the movable contact member and it is also unnecessary to resiliently mount the contacts as disclosed in the Sachs application Ser. No. 152,020 referred to in said patent, which application issued as Patent No. 2,209,351 on July 30, 1940. The elimination of the requirement for a resilient link between the handle and the releasably latched switch actuator is obviated pursuant to my present invention whereby the connection between the handle and the actuator can be constituted by a rigid link, if desired, and yet a resilient mounting of the contacts is not required.

Pursuant to the present invention and an object thereof, a single spring is operable (1) to bias the movable contact member to open-circuit position and to move the movable contact member quickly to open-circuit position when the actuator is unlatched pursuant to the operation of the current-responsive latch device, (2) to resiliently oppose movement of the movable contact member from circuit-open position to circuit-closed position, (3) to resiliently hold the handle in the "on" position thereof when the circuit breaker is closed and to move the handle to its "off" position when the circuit breaker is tripped, and (4) to bias the movable contact member to resiliently press the movable contact against the stationary contact for proper contact pressure when the circuit breaker is closed, to compensate for wear of the contact, or for other inequalities.

In conjunction with the above mentioned spring, the construction of the circuit breaker of the present invention is such that provision is made for limited bodily movement of the movable contact member on a floating pivot to a limited extent to provide for the above mentioned action of the spring while the circuit breaker is closed, i. e., to provide the required resilient pressure between the companion contacts of the circuit breaker, to compensate for wear or other inequalities.

The above objects, features and advantages of the present invention will be fully understood, as will the invention itself, from the following description considered in connection with the accompanying illustrative drawings showing the presently preferred embodiment of this invention.

In the drawings:

Fig. 1 is a side view of a circuit breaker embodying the present invention, one of the casing parts being removed for the purpose of illustration, the circuit breaker mechanism being shown closed;

Fig. 2 is a view similar to Fig. 1 showing the circuit breaker mechanism open;

Fig. 3 is a sectional view on the line 3—3 of Fig. 1;

Fig. 4 is a sectional view on the line 4—4 of Fig. 1;

Fig. 5 is an end view of the circuit breaker, both casing parts being in place; and Figs. 6 and 7 are sectional views on the lines 6—6 and 7—7 respectively of Fig. 3.

Referring now to the drawings in detail the circuit breaker embodying the present invention comprises a two-part insulation casing having the complementary molded parts 10 and 12 in which the terminals 14 and 16, and the circuit breaker mechanism are mounted, as described for example in application Serial No. 127,433, filed November 15, 1949, by Thomas M. Cole, now Patent No. 2,647,186 dated July 28, 1953, and in application Serial No. 217,162, filed March 23, 1951, by me and Thomas M. Cole, now Patent No. 2,642,509, dated June 16, 1953. It will be understood that the two casing parts 10 and 12 are held together by bolts or other suitable means passing through openings 18 in casing part 10 and similar openings in casing part 12 which register with said opening 18 when the two casing parts are in assembled relation. While as here shown, the terminal member 16 is in the form of a prong of the plug-in type as described in the above mentioned application Serial No. 127,433, it will be understood that this is not essential to the present invention but on the contrary a different type of terminal member can be provided instead.

The stationary contact 20 is carried by the terminal member 14 in a position within the casing to be engaged by the movable contact 22 carried by the movable contact member 24. Said movable contact member is mounted for pivotal movement between the casing parts 10 and 12 to and from the circuit-closed position illustrated in Fig. 1, in which contact 22 engages the stationary contact 20, and to and from the circuit-open position illustrated in Fig. 2 in which said movable contact 22 is shown disengaged from said stationary contact 20. This movement may be accomplished manually by the handle 26 which is connected to the channel-shaped actuator 28 by a U-shaped link 30 which is pivotally connected at one end thereof to said handle and at its opposite end to said actuator as will hereinafter be more specifically described. The actuator 28 is pivotally mounted on the movable contact member as indicated at 32 and is operatively connected to the movable contact member 24 for moving the latter, under the control of the current-responsive latch 34 which includes a bimetallic strip 36 and an electro magnet device 38, 40 by which said actuator 28 is releasably latched to the movable contact member 24 as described in the above mentioned application Serial No. 127,433. As described in the application Serial No. 217,162, filed March 23, 1951, by me and Thomas M. Cole the pivot for the movable contact member may include the calibration device which comprises a screw 42 having a tapering part 44 and which includes the nut 46. The tapering part 44 engages the movable contact member in an opening 48 adjacent to and laterally in communication with recess 50 in the movable contact member so that by turning the screw 42 in a clockwise direction, viewing Fig. 1, part 24a, of the movable contact member may be moved or displaced in a counter-clockwise direction (viewing Figs. 1 and 2) with respect to the other part 24b of the movable contact member to which the latch device 34 is secured, whereby to provide the desired degree of overlap of the part 28a of the actuator 28, thus to predetermine the amount of flexing of the bimetallic strip 36 in actuator-releasing direction, in response to load condition, for tripping the circuit breaker. Although in the illustrated embodiment, the pivot and calibration device are found as a unit, this is not an essential feature of the present invention and the pivot and calibration may be separate devices as shown, for example in the above mentioned application of Thomas M. Cole, Serial No. 127,433.

It will be understood that as illustrated in Fig. 1 when the handle 26 is in the "on" or circuit-closed position thereof and the actuator 28 is latched to the movable contact member 24 by engagement with the outer end of the bimetallic strip 36, as shown, relative pivotal movement between the actuator and the movable contact member is prevented and contact 22 is in engagement with contact 20. In this position, the link 30, which pursuant to the present invention may be a rigid link, and the actuator 28, are in overset toggle condition and that in order for the circuit breaker to open either automatically, i. e., pursuant to the flexing of the bimetal strip 36, either upon heating thereof or by the attraction of member 38 to the armature 40 of the electromagnet, the toggle must be broken, and this can take place either by movement of the handle 26 to its circuit-open position (Fig. 2) manually or by release of the end 28a of the actuator by the bi-metal strip 36, when the circuit breaker trips upon overload or other predetermined load conditions. The opening of the circuit breaker when the latch 34 releases the actuator 28 is effected by the spring 52 which is connected at one end thereof to the handle to the part 54 thereof and at its other end to the movable contact member as indicated at 56. It will be observed that said spring is a tension spring and is connected to the movable contact member so as to bias the latter to circuit-open position and to move the latter to said position when latch 34 disengages actuator 28. Also it will be noted that said spring is effective to move the handle 26 to its "off" or circuit-open position when the circuit breaker is tripped, that is when the movable contact member moves to a circuit-open position pursuant to the release of actuator 28 by latch 34. Further it will be observed that even though the handle 26 is held in "on" position, said spring is effective to open the circuit breaker when the latter is tripped, i. e., when latch 34 disengages actuator 28.

A feature of the present invention is the provision of the floating pivot for the movable contact member 24 in conjunction with the spring 52 for permitting a limited bodily movement of the movable contact member and for biasing the movable contact 22 toward the stationary contact 20, in the closed-circuit position of said movable contact 24 in order to provide the proper pressure between said contacts when they are engaged, or to compensate for wear or other inequalities in the various cooperating parts of the circuit breaker. For this purpose, the bearing part 58 of pivot screw 42 and the portion 60 of the companion nut 46 have limited movement in the bearing recesses 62 and 64, respectively, of casing parts 12 and 10, respectively. In this connection it will be observed that bearing recesses 62 and 64 are elongated for slidable engagement, to a limited extent by the corresponding parts 58 and 60 at the pivot device in a direction transversely of the pivot axis. It will be noted that in the closed condition of the circuit breaker as illustrated in Fig. 1, in which the movable contact member is restrained against pivotal movement, spring 52 being under tension, biases said movable contact member 24 for bodily movement toward the handle 26, that is in a direction to press movable contact 22 resiliently against the stationary contact 20. In this connection it will be understood further that while spring 52 is thus effective in this manner to press contact 22 against contact 20 it is also potentially effective to move the movable contact member 24 pivotally to circuit-opening position the instant latch 34 operates to disengage or release the actuator 28.

Referring now more specifically to handle 26 and link 30, it will be observed that said handle 26 is here shown in two parts 66 and 68 interlocked with each other, for unitary pivotal movement, by a projection 70 on part 66 which fits into a recess 72 in part 68. The pivotal mounting for said handle comprises the cylindrical projections 74 and 76 on the handle parts which are journaled in bearing recesses 77 and 78 in casing parts 10 and 12, respectively. It will be noted that the inner handle portions 80 and 82 are spaced from each other in confronting relation and that the part 54 to which spring 52 is connected is integral with handle portion 80 and projects into the space between handle portions 80 and 82. Said portions 80 and 82 are also provided with internal projections 84 and 86 forming pivotal bearings for the arms 88 and 90 of link 30 which connects the handle to the actuator 28. Said link also includes a cross member 92 which connects said arms 88 and 90 to each other, and a pivot pin 94 pivotally connects arms 88 and 90 to the adjacent end of actuator 28.

It will be understood that various changes in the details of construction and in the arrangement of parts may be made without departing from the underlying idea or principles of the present invention within the scope of the appended claims.

Having thus described my invention, what I claim and desired to secure by Letters Patent is:

1. An automatic circuit breaker having a stationary contact, a movable contact member having a contact engageable with and disengageable from said stationary contact, a current-responsive latch carried by said movable contact member, pivot means for said movable contact member, said pivot means providing for limited bodily movement of said movable contact member, an actuator pivotally mounted on said contact member and operatively connected thereto, under control of said latch, for closing the circuit breaker, and a spring operable directly on said movable contact member to resiliently urge the contacts into engagement, whereby to provide for proper contact pressure between said contacts in the closed condition of the circuit breaker.

2. A circuit breaker comprising relatively movable companion contacts engageable with and disengageable from each other for closing and opening the circuit breaker, a movable member carrying one of said contacts, means for actuating said movable member to engage and disengage said companion contacts, said actuating means including latching means, and spring means for disengaging said contacts in the unlatched condition thereof, means providing a floating mounting on which said movable member is carried, and an operative connection of said spring means to said movable member operable in conjunction with said floating mounting for exerting contact pressure between said companion contacts in the engaged condition thereof, a handle for manually operating said breaker and movable to "on" and "off" positions corresponding to the engaged and disengaged conditions, respectively, of said contacts, and a connection of said spring means to said handle for moving the latter to its "off" position concomitantly with the opening of the circuit breaker by said spring means.

3. A circuit breaker comprising relatively movable companion contacts engageable with and disengageable from each other for closing and opening the circuit breaker, a movable member carrying one of said contacts, means for actuating said movable member to engage and disengage said companion contacts, said actuating means including latching means, and spring means for disengaging said contacts in the unlatched condition thereof, means providing a floating mounting on which said movable member is carried, and an operative connection of said spring means to said movable member operable in conjunction with said floating mounting for exerting contact pressure between said companion contacts in the engaged condition thereof, a handle for manually operating said breaker and movable to "on" and "off" positions corresponding to the engaged and disengaged conditions, respectively, of said contacts, and a toggle device connected to said movable member and operable by said handle to move said movable member to engage said contacts with each other and to hold them engaged in the latched condition of the breaker, said spring means being connected to said handle for operating the latter to hold the toggle links releasably in overset relation in the latched condition of the breaker, and said spring means being connected to said movable member between said toggle means and said floating mounting.

4. A circuit breaker comprising relatively movable contacts engageable with and disengageable from each other for making and breaking the circuit, a pivotally movable member carrying one of said contacts, a pivoted actuator and a current responsive latch carried by said movable member, said actuator being operable under the control of said latch to move said member to circuit-closing position, a pivoted handle having an operative rigid-member connection with said actuator to actuate the latter, and a tension spring connected at one end to said handle and at its other end to said movable member, said connection between said handle and said actuator including a link which forms a toggle with said actuator, said toggle being overset in the circuit making position of said movable contact-carrying member and said spring releasably holding said toggle in said overset condition when said actuator is latched to said movable member in said circuit making position thereof.

5. A circuit breaker comprising relatively movable contacts engageable with and disengageable from each other for making and breaking the circuit, a pivotally movable member carrying one of said contacts, a pivoted actuator and a current responsive latch carried by said movable member, said actuator being operable under the control of said latch to move said member to circuit-closing position, a pivoted handle having an operative rigid-member connection with said actuator to actuate the latter, and a tension spring connected at one end to said handle and at its other end to said movable member, said connection between said handle and said actuator including a link which forms a toggle with said actuator, said toggle being overset in the circuit making position of said movable contact-carrying member and said spring releasably holding said toggle in said overset condition when said actuator is latched to said movable member in said circuit making position thereof, said spring being operable to move said movable member and said handle to open-circuit positions when said actuator is released by said latch.

6. An automatic circuit breaker having a stationary contact, a movable contact member having a contact engageable with and disengageable from said stationary contact, a current-responsive latch carried by said movable contact member, pivot means for said movable contact member, said pivot means providing for limited bodily movement of said movable contact member, an actuator pivotally mounted on said contact member and operatively connected thereto, under control of said latch, for closing the circuit breaker, and a spring operable directly on said movable contact member between said pivot means and said actuator to resiliently urge the contacts into engagement, whereby to provide for proper contact pressure between said contacts in the closed condition of the circuit breaker.

7. A circuit breaker, including relatively removable companion contacts engageable with and disengageable from each other for closing and opening the circuit breaker, an elongated movable contact member carrying one of said contacts at one end thereof, said movable contact member having a loose pivotal mounting at a point spaced substantially from its ends and affording limited bodily movement thereof, current-responsive latching means, and actuating means for closing the circuit breaker under control of said latching means, said actuating means including a manual operating element and a rigid-member drive connection from said manual operating element to the end of said movable contact member remote from said one contact to drive the movable member in the contact-closing direction, and a spring directly engaging said movable contact member and arranged to be increasingly stressed during closing of the companion contacts and thus to store an increasing amount of spring energy during said closing operation and said spring being effective to apply contact pressure, said spring acting to drive said movable contact member about said pivotal mounting upon release of said latching means to open said contacts and to return said rigid-member drive connection and said manual operating element to its circuit-breaker-open position.

8. A circuit breaker in accordance with claim 7 wherein said rigid-member drive connection is in the form of a toggle arranged to be over-set when the contacts have closed.

9. A circuit breaker comprising relatively movable companion contacts engageable with and disengageable from each other for closing and opening the circuit breaker, a movable member carrying one of said contacts and biased to effect separation of said contacts when the circuit breaker is conditioned to open, said movable member being provided with a floating pivotal mounting between the ends thereof, means for actuating said movable member to engage and disengage said companion contacts, said movable member being provided with one of said contacts at one side of said pivotal mounting thereof, a rigid-member drive mechanism acting directly on said movable member at the other side of said pivotal mounting, and a spring acting directly on said movable member and cooperating with said drive mechanism for exerting contact pressure between said companion contacts in the engaged condition thereof, and trip means operable in response to predetermined current conditions to immediately relieve said contact pressure and to effect the opening of said circuit breaker.

10. A circuit breaker comprising relatively movable contacts engageable with and disengageable from each other for making and breaking the circuit, a pivotally movable member carrying one of said contacts, and biased to effect separation thereof when the circuit breaker is conditioned to open, a pivoted actuator and a current responsive latch carried by said movable member, a manual operating element having a rigid-member drive connection to said actuator, said actuator being operable under the control of said latch to move said member to circuit-closing position, and a spring acting directly on said movable contact member to provide contact pressure between said contacts in the engaged condition thereof.

11. A circuit breaker comprising relatively movable contacts engageable with and disengageable from each other for making and breaking the circuit, a pivotally movable member carrying one of said contacts, and biased to effect separation thereof when the circuit breaker is conditioned to open, a pivoted actuator and a current responsive latch carried by said movable member, a manual operating element having a rigid-member drive-connection to said actuator, said actuator being operable under the control of said latch to move said member to circuit-closing position, and a spring acting directly on said movable contact member to provide contact pressure between said contacts in the engaged condition thereof, said spring being a tension spring and being operable to open the breaker in response to predetermined current condition.

12. An automatic circuit breaker having a stationary contact, a pivotally movable contact member having a contact engageable with and disengageable from said stationary contact, a current responsive latch carried by said movable contact member, and an actuator pivotally mounted on said contact member and operatively connected thereto, under the control of said latch, for closing the circuit breaker, a pivot on which said movable contact member is mounted for said pivotal movement thereof, means mounting said pivot for limited bodily movement, and spring means operable to effect a limited bodily movement of said movable contact member while said actuator is latched thereto in a direction to resiliently urge said movable contact against said stationary contact, whereby to provide for proper contact pressure between said contacts in the closed condition of the circuit breaker.

13. An automatic circuit breaker having a stationary contact, a pivotally movable contact member having a contact engageable with and disengageable from said stationary contact, a current responsive latch carried by said movable contact member, and an actuator pivotally mounted on said contact member and operatively connected thereto, under the control of said latch, for closing the circuit breaker, a pivot on which said movable contact member is mounted for said pivotal movement thereof, means mounting said pivot for limited bodily movement, a manually operable handle movable to different positions for operating the movable contact member to open and close the circuit breaker in the manual operation thereof, a connection between said handle and said actuator which prevents relative pivotal movement between said actuator and the movable contact member when the handle is in circuit-closing position and the actuator is latched to said movable contact member, and spring means operable to effect a limited bodily movement of said movable contact member while said actuator is latched thereto in a direction to resiliently urge said movable contact against said stationary contact, whereby to provide for proper contact pressure between said contacts in the closed condition of the circuit breaker.

14. An automatic circuit breaker having a stationary contact, a pivotally movable contact member having a contact engageable with and disengageable from said stationary contact, a current responsive latch carried by said movable contact member, and an actuator pivotally mounted on said contact member and operatively connected thereto, under the control of said latch, for closing the circuit breaker, a pivot on which said movable contact member is mounted for said pivotal movement thereof, means mounting said pivot for limited bodily movement, a manually operable handle movable to different positions for operating the movable contact member to open and close the circuit breaker in the manual operation thereof, a connection between said handle and said actuator which prevents relative pivotal movement between said actuator and the movable contact member when the handle is in circuit-closing position and the actuator is latched to said movable contact member, and spring means operable to effect a limited bodily movement of said movable contact member while said actuator is latched thereto in a direction to resiliently urge said movable contact against said stationary contact, whereby to provide for proper contact pressure between said contacts in the closed condition of the circuit breaker, said movable contact and said actuator being provided on said movable contact member at opposite sides, respectively, of said pivot, and said spring means being operable on said movable contact member at one side of said pivot to move the movable contact member to circuit-open position when said latch disengages said actuator.

15. An automatic circuit breaker having a stationary contact, a pivotally movable contact member having a contact engageable with and disengageable from said stationary contact, a current responsive latch carried by said movable contact member, and an actuator pivotally mounted on said contact member and operatively connected thereto, under the control of said latch, for closing the circuit breaker, a pivot on which said movable contact member is mounted for said pivotal movement thereof, means mounting said pivot for limited bodily movement, a manually operable handle movable to different positions for operating the movable contact member to open and close the circuit breaker in the manual operation thereof, a connection between said handle and said actuator which prevents relative pivotal movement between said actuator and the movable contact member when the handle is in circuit-closing position and the actuator is latched to said movable contact member, and spring means operable to effect a limited bodily movement of said movable contact member while said actuator is latched thereto in a direction to resiliently urge said movable contact against said stationary contact, whereby to provide for proper contact pressure between said contacts in the closed condition of the circuit breaker, said movable contact and said actuator being provided on said movable contact member at opposite sides, respectively, of said pivot, and said spring means being operable on said movable contact member between said pivot and said actuator and operable on said handle to move the movable contact member and said handle to their respective circuit-open positions when said latch disengages said actuator.

16. An automatic circuit breaker having a stationary contact, a pivotally movable contact member having a contact engageable with and disengageable from said stationary contact, a current responsive latch carried by said movable contact member, and an actuator pivotally mounted on said contact member and operatively connected thereto, under the control of said latch, for closing the circuit breaker, a pivot member on which said movable contact member is mounted and bearing means for said pivot member in which the latter has a limited movement transversely of the pivotal axis, and spring means operatively connected to said movable contact member for biasing the same for movement transversely of said pivot in contact-engaging direction while the contacts are engaged in the latched condition of the circuit breaker.

17. A circuit breaker comprising relatively movable contacts engageable with and disengageable from each other for making and breaking the circuit, a pivotally movable member carrying one of said contacts, a pivoted actuator and a current responsive latch carried by said movable member, said actuator being operable under the control of said latch to move said member to circuit-closing position, a pivoted handle having an operative connection with said [latch] *actuator* to actuate the latter, and a tension spring connected at one end to said handle and at its other end to said movable member between the pivotal axis thereof and said actuator, said connection between said handle and said actuator including a link which forms a toggle with said actuator, said toggle being overset in the circuit making position of said movable contact-carrying member and said spring releasably holding said toggle in said overset condition when said actuator is latched to said movable member in said circuit making position thereof.

18. A circuit beraker comprising a stationary contact, a pivotally movable member provided with a contact movable thereby for engagement with and disengagement from said stationary contact, a manually operable handle movable to "on" and "off" positions thereof, rigid-element means interconnecting said handle and said movable member for operation of said movable member by said handle to close said contacts in said "on" position of said handle and to move said movable member to a reset position in the "off" position of said handle wherein said contacts are disengaged, current responsive means releasably latching said movable member in the circuit closed disposition thereof and operable upon predetermined current conditions to unlatch said movable member for disengaging said contacts, and spring means operable upon said unlatching of said movable member to open said circuit breaker, said spring means being a tension spring operatively interconnected between said handle and said movable member and effective in the closed position of said circuit breaker and after unlatching thereof to bias said movable member in a direction to disengage said contacts and to concomitantly bias said handle for movement to said "off" position thereof.

19. A circuit breaker comprising a stationary contact, a pivotally movable member provided with a contact movable thereby for engagement with and disengagement from said stationary contact, a manually operable handle movable to "on" and "off" positions thereof, rigid-element means interconnecting said handle and said movable member for operation of said movable member by said handle to close said contacts in said "on" position of said handle and to move said movable member to a reset position in the "off" position of said handle wherein said contacts are disengaged, current responsive means releasably latching said movable member in the circuit closed disposition thereof and operable upon predetermined current conditions to unlatch said movable member for disengaging said contacts, and spring means operable upon said unlatching of said movable member to open said circuit breaker, said spring means being a tension spring operatively interconnected between said handle and said movable member and effective in the closed position of said circuit breaker and after unlatching thereof to bias said movable member in a direction to disengage said contacts and to concomitantly bias said handle for movement to said "off" position thereof, one end of said tension spring being connected to said handle and the other end thereof being connected to said movable member.

20. A circuit breaker in accordance with claim 19, wherein said means interconnecting said handle and said movable member includes an actuator in latching engagement with said current responsive means when the circuit breaker is being closed and when it remains closed, said movable member together with said current responsive means and said actuator when latched being a triangular assembly movable with the movable contact member as a unit when the circuit breaker is being closed, and said tension spring providing bias for retaining said handle and said triangular assembly in the "on" position when latched.

*21. In a circuit breaker having a stationary contact, a pivotally movable switch member having a contact engageable with, and disengageable from said stationary contact, a current responsive latch carried by said movable switch member, and an actuator pivotally mounted on said movable member and operatively connected thereto, under the control of said latch, for closing the circuit breaker; first pivot means for said movable member for said pivotal movement thereof, said pivot means providing for limited bodily movement of said movable member while the actuator is latched thereto, additional pivot means for said movable member operable in conjunction with said first pivot means to provide for proper contact pressure between said contacts in the closed condition of the circuit breaker, and spring means operatively connected to said movable member for biasing the same for pivotal movement about said additional pivot means in contact-engaging direction while the contacts are engaged in the latched condition of the circuit breaker.*

*22. A circuit breaker, as defined in claim 21, further characterized in that said additional pivot means is constituted by a pivot element which mounts said actuator on said switch member.*

*23. A circuit breaker comprising relatively movable companion contacts engageable with and disengageable from each other for closing and opening the circuit breaker, a movable member provided with one of said contacts, means for actuating said movable member to engage and disengage said companion contacts, said actuating means including latching means, spring means for disengaging said contacts in the unlatched condition thereof, pivot means providing for limited bodily movement of said movable member, additional pivot means for said movable member about which said member is movable to provide for proper contact pressure between said contacts in the closed condition of the circuit breaker, and an operative connection of said spring means to said movable member for biasing the same for said movement about said additional pivot means in contact-engaging direction while the contacts are engaged in the latched condition of the circuit breaker.*

*24. A circuit breaker, as defined in claim 23, further characterized that said spring means is engaged with said movable member at a point thereon between both of said pivot means.*

*25. An automatic circuit breaker having a stationary contact, an elongated movable contact member having a second contact fixed thereto and engageable with and disengageable from said stationary contact, a current-responsive latch carried by said movable contact member, an actuator pivotally mounted on said contact member at a point remote from said second contact, rigid-element drive means to operate said actuator and thereby to operate said movable contact member, said actuator being operatively connected to said movable contact member under control of said current-responsive latch for closing the circuit breaker, and means acting on said elongated movable contact member between said second contact and said actuator to effect pivoting of the movable contact member, said means providing for limited bodily movement for said contact member and for pivotal movement thereof at the limits of bodily movement and said means including a spring operable on said movable contact member at a point between said second contact and said actuator to resiliently urge the contacts into engagement upon operation of said actuator, whereby to provide for resilient contact pressure between said contacts in the closed condition of the circuit breaker.*

References Cited in the file of this patent or the original patent

UNITED STATES PATENTS

| | | |
|---|---|---|
| 1,925,422 | Walsh | Sept. 5, 1933 |
| 2,011,311 | Gaynor | Aug. 13, 1935 |
| 2,065,357 | Von Hoorn | Dec. 22, 1936 |
| 2,150,012 | Von Hoorn | Mar. 7, 1939 |
| 2,184,372 | Von Hoorn | Dec. 26, 1939 |
| 2,209,319 | Christensen | July 30, 1940 |
| 2,209,351 | Sachs | July 30, 1940 |
| 2,288,081 | Frank | June 30, 1942 |
| 2,290,495 | Sandin et al. | July 21, 1942 |
| 2,416,266 | Landmeier | Feb. 18, 1947 |
| 2,459,427 | Humpage | Jan. 18, 1949 |
| 2,642,509 | Cole et al. | June 16, 1953 |
| 2,647,186 | Cole | July 28, 1953 |
| 2,660,637 | Thomas | Nov. 24, 1953 |